United States Patent [19]

Marsh

[11] 4,161,914

[45] Jul. 24, 1979

[54] RAILWAY SLEEPING CAR COMPARTMENTAL ARRANGEMENT

[75] Inventor: Ronald W. Marsh, Michigan City, Ind.

[73] Assignee: Pullman Incorporated, Chicago, Ill.

[21] Appl. No.: 806,792

[22] Filed: Jun. 15, 1977

[51] Int. Cl.$^2$ .................................................. B60N 3/00

[52] U.S. Cl. ...................................... 105/344; 105/315

[58] Field of Search ............... 105/314, 315, 316, 325, 105/326, 323, 329 R, 340, 343, 344, 345; 296/19, 20, 65 R, 65 A, 23 R, 28 A

[56] References Cited

U.S. PATENT DOCUMENTS

| | | | |
|---|---|---|---|
| 1,119,466 | 12/1914 | Stebbins | 105/315 |
| 2,400,462 | 5/1946 | Ledwinka et al. | 105/329 R |
| 2,548,851 | 4/1951 | Watter | 105/315 |
| 2,561,653 | 7/1951 | Eksergian | 105/315 |

*Primary Examiner*—Francis S. Husar
*Assistant Examiner*—Ross Weaver
*Attorney, Agent, or Firm*—Richard J. Myers

[57] ABSTRACT

A railway passenger sleeping car is provided with standard base compartments communicating with a standard size aisle remotely positioned from the car vestibule. The car includes a vestibule having an enlarged aisle which communicates with an enlarged compartment having an annex for storing special equipment for the handicapped. The vestibule aisle and enlarged compartment are positioned close to the car door openings.

9 Claims, 2 Drawing Figures

RAILWAY SLEEPING CAR COMPARTMENTAL ARRANGEMENT

BACKGROUND OF THE INVENTION

1. Field of the Invention

The invention relates to passenger cars particularly to those having sleeper car arrangements. More specifically, the invention is concerned with a car arrangement accommodating travel by handicapped persons.

2. Description of the Prior Art

Some of the prior art is disclosed in U.S. Pat. Nos. 1,534,847, Apr. 21, 1925; 2,681,016, June 15, 1954; 3,730,583 May 1, 1973, and 2,732,814, Jan. 31, 1956. The present invention is an improvement over the prior art patents.

SUMMARY OF THE INVENTION

In the present inventions a sleeping car arrangement includes base or standard types of compartments which are positioned along the sides of the car with an aisle therebetween. However, the present sleeping railway car is arranged to have an enlarged compartment particularly adapted for serving handicapped persons in need of special equipment such as wheel chairs and the like. This compartment of considerably larger size than the standard or base compartments is positioned adjacent to a large aisle which in turn connects the vestibule and thus permits for ease of entrance and exit by handicapped persons. The enlarged aisle which connects the vestibule is also connected to a smaller standard size aisle which connects the other compartments that are remotely positioned from the car entrance vestibule. A toilet compartment is also arranged adjacent to the vestibule so that it may have ready access to a handicapped person traveling in a wheel chair through the enlarged aisle.

DESCRIPTION OF THE PREFERRED EMBODIMENT

Figure 1:
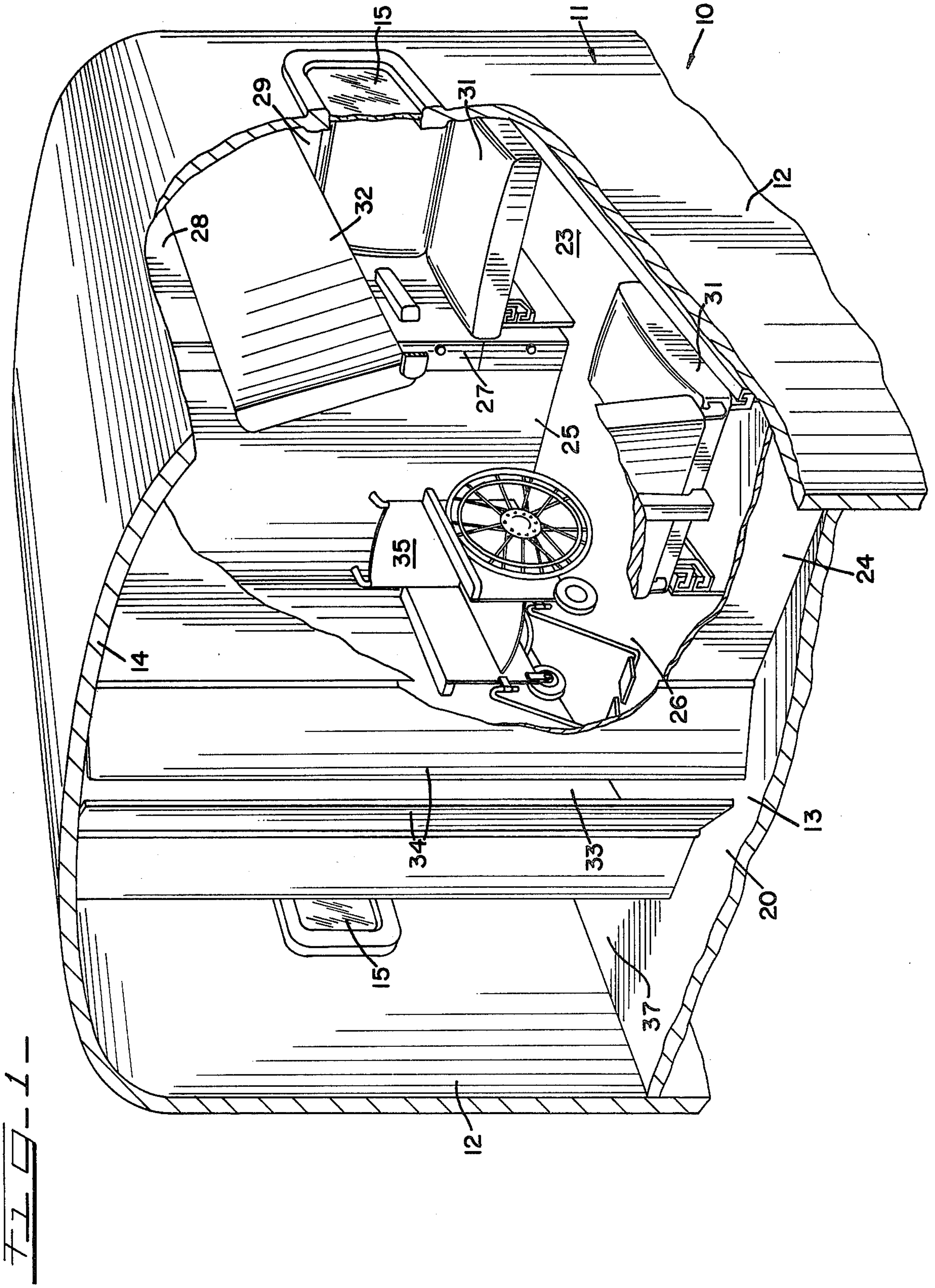
FIG. 1 is a perspective view through a portion of a railway car disclosing a sleeping compartment for a handicapped person.
Figure 2:
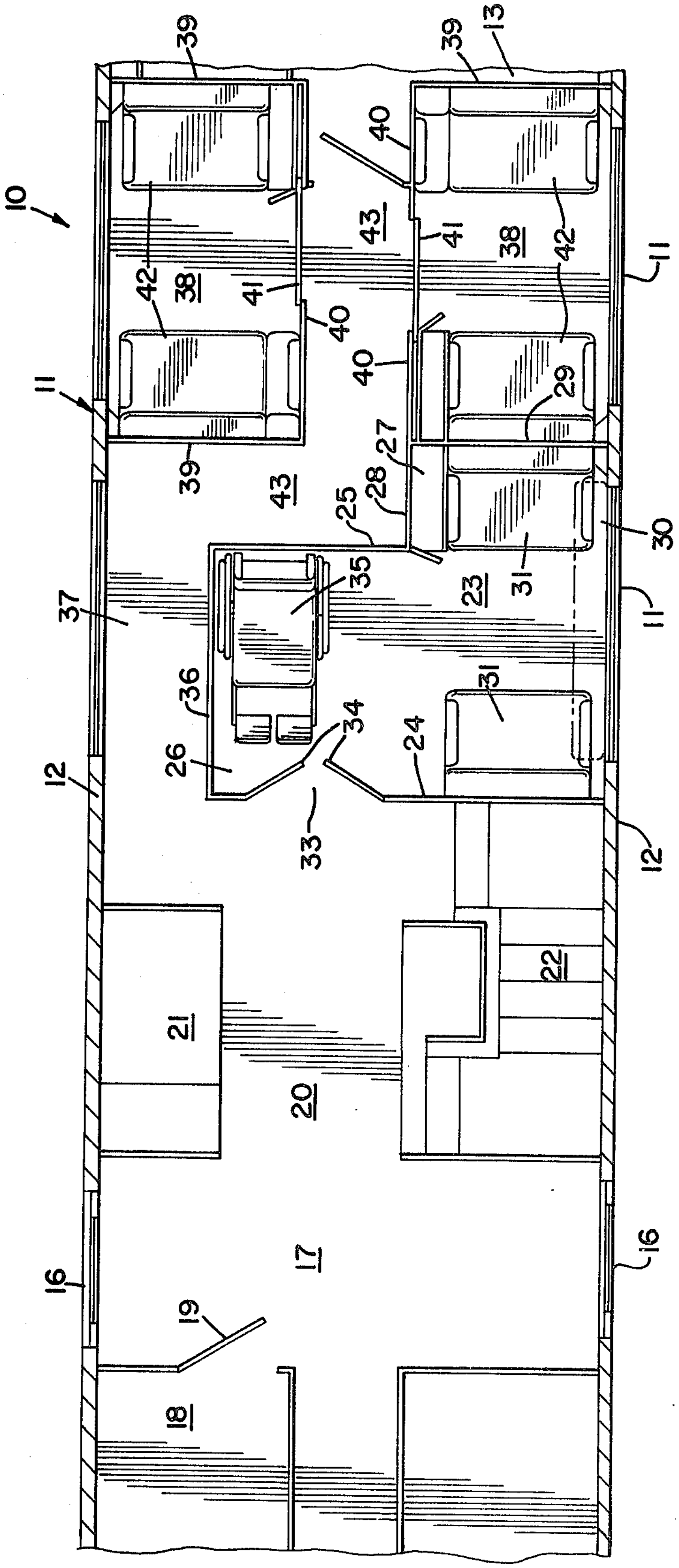
FIG. 2 is a plan view with the roof removed of a portion of a railway car disclosing aisles and various sleeping compartment arrangements.

Referring to FIGS. 1 and 2 an improved sleeping car 10 includes a car body 11 formed by side walls 12. The body of course also is provided at opposite ends with end walls (not shown) only a portion of the sleeping car arrangement being disclosed. The car 10 also includes a floor 13 and a roof 14 with the sides including the usual side windows 15. The side walls 12 include entrance and exit doors 16 which open directly into a fairly enlarged vestibule 17. Positioned immediately adjacent to the vestibule on one side of the car is a toilet 18 for handicapped persons with a door and a doorway 19 of enlarged shape so as to accommodate wheel chairs and other special equipment of the like. The vestibule 17 is also in communication with an enlarged aisle 20 formed on one side by a storage cabinet 21 and on the other side by a stairway 22 which leads to an upper level of the sleeping car 10.

A special or handicapped persons compartment 23 is formed by longitudinally spaced transverse walls 24 and 25 the said compartment being considerably larger than the base compartments which are standard and which will be later described. The compartment 23 includes an annex 26 which is sufficiently large to accommodate special types of equipment for handicapped persons such as a wheel chair. The compartment 23 also includes a storage space or cabinet 27 which is disposed in an offset longitudinal wall portion 28 in turn connected to a laterally extending wall portion 29 and thereby providing an offset space designated at 30 in FIG. 2. Thus the longitudinally spaced transverse wall 25 includes an offset longitudinal wall 28 and a lateral wall portion 29.

The compartment 23 includes convertible seats 31 which are positioned in face-to-face relation and which can readily be converted to a longitudinally extending bed when desired. The compartment 23 may also contain the usual conventional upper berth conventional in the art of sleeping compartments.

The wall 24 adjacent to the annex 26 is provided with a pair of enlarged swinging doors 34 which may readily be opened to permit a handicapped person occupying a wheel chair to be transported into the special compartment. Such a wheel chair is generally designated at 35 but it is of course readily apparent that other special handicapped persons equipment of large bulk may be utilized and placed in the annex. The longitudinally spaced transverse walls 24 and 25 are enclosed by a longitudinal wall 36 which is laterally spaced from the other side of the car to provide a longitudinal aisle 37 of reduced size when compared with the aisle 20.

As best shown in FIG. 2 a pair of base or standard compartments 38 are disclosed. These compartments are of conventional size and are disposed on opposite sides of the car. Each consists of longitudinally spaced inwardly extending walls 39 which are connected to longitudinal divider walls 40 having suitable openings and doors 41. Convertible seats 42 similar to the seats 31 are positioned for use in these compartments. It is to be noted that the wall portion 29 of the wall 25 is a common wall between the compartment 23 and one of the compartments 38. The compartments 38 are positioned apart so as to provide an L-shaped aisle 43 of reduced size communicating with the aisle 37 which in turn communicates with the enlarged aisle 20.

It is apparent that the compartments 38 are remotely positioned with reference to the enlarged aisle 20 in vestibule 17. This of course permits a handicapped person in a wheel chair to readily and comfortably enter the doors 16 and vestibule 17 whereupon only a short distance is traversed before the handicapped person is within his own enlarged compartment with the annex for storing his wheel chair. The toilet 18, which includes an enlarged door 19, is immediately available to the handicapped individual by virtue of the positioning of the enlarged compartment relative to the vestibule and toilet facilities. Access to the more remote compartments 38 by other persons is not hampered in any way by the enlarged aisle 20 or the disposition of the relative compartments. Thus it is apparent that an improved arrangement has been disclosed for accommodating special situations as may be encountered by handicapped persons.

What is claimed is:

1. In a passenger car including a car having first and second side walls, a roof and floor structure, a vestibule in said car, a first access and exit door in said side walls communicating directly with said vestibule, the improvement of an arrangement for accomodating a wheel chair for handicapped persons comprising, a first aisle of a width accomodating said wheel chair communicating directly with said vestibule, an enlarged passenger compartment accomodating a person confined to a wheel chair including a pair of longitudinally spaced walls extending laterally from said first side wall and terminating short of said second side wall, a longitudinally extending divider wall connecting said longitudinally spaced walls, a pair of seats within said compartment, a second access and exit door in one of said longitudinally spaced walls communicating directly with said first aisle and being generally longitudinally aligned therewith, said second door being of substantially the same width as said first aisle thereby accomodating passage therethrough of said wheel chair, a space within said compartment adjacent to said second access and exit door and being generally longitudinally aligned with said first aisle for accomodating said wheel chair, said longitudinal alignment of the above mentioned elements providing ease of access and use of said compartment and minimizing essential maneuvering of wheel chairs within the car, a second aisle of lesser width than said first aisle disposed between said divider wall and said second side wall and communicating with said first aisle, and additional compartments within said car of lesser size in area than said enlarged compartment disposed remotely from said vestibule and said first aisle, said additional compartments communicating with said second aisle and said second aisle providing a relative passenger boundary between said enlarged and additional compartments.

2. The invention in accordance with claim 1, said arrangement including a toilet having a door of sufficient width to accommodate the passage of a wheel chair therethrough communicating directly with said first aisle.

3. The invention in accordance with claim 2, said toilet communicating with said vestibule.

4. The invention in accordance with claim 1, said seats in said enlarged compartment being located along said first side wall and being convertible to sleeping accommodations.

5. The invention in accordance with claim 4, the other of said longitudinally spaced walls having a longitudinally offset wall portion providing a space of L-shaped configuration within which one of said seats is disposed.

6. The invention in accordance with claim 1, said first aisle being disposed adjacent to a storage cabinet on one of said side walls, and a multi-level stairway on the other one of said side walls.

7. The invention in accordance with claim 5, said additional compartments including second longitudinal divider walls connected to longitudinally spaced second laterally extending walls, said second longitudinal walls being spaced to provide a third aisle therebetween, said third aisle communicating with said second and first aisles.

8. The invention in accordance with claim 7, said third aisle being of L-shaped configuration.

9. The invention in accordance with claim 8, said offset wall portion of said enlarged compartment providing a common wall between said enlarged compartment and one of said other compartments.

* * * * *